Patented May 9, 1950

2,507,482

UNITED STATES PATENT OFFICE 2,507,482

METHOD OF PRODUCING A LACTEAL BEVERAGE

Everette C. Scott, Ashton, Ill., assignor, by mesne assignments, to Swift & Company, a corporation of Illinois No Drawing. Application January 8, 1947, Serial No. 720,933

2 Claims. (Cl. 99—28)

The present invention relates to a food product and more particularly to a malted milk type of beverage and the process for preparing the same.

The present practice of preparing malted milk shakes in drug or confectionery stores is to place in a tall metal or glass cup, of 16 to 18 fluid ounce capacity, an amount of ice cream approximately equivalent to two No. 12 scoops of ice cream, 3 to 6 fluid ounces of cold whole milk, 1 to 2 fluid ounces of chocolate syrup, and 1 to 2 teaspoonfuls of malted milk, usually in the order given, then mixing and stirring these ingredients by means of a malted milk mixer until there results a smooth, thick, viscous, cold beverage.

The conventional preparation of the product requires such extensive facilities of storage space and expensive refrigeration equipment to keep the ingredients in proper form that milk shakes are usually prepared and dispensed by commercial establishments especially adapted for handling this popular beverage.

An object of the present invention is to provide a process of preparing milk shakes whereby extensive equipment is unnecessary.

Another object of the invention is to provide a process whereby milk shakes may be prepared in remote areas where ice cream is not available.

A further object of the invention is to provide a process whereby milk shakes may be prepared in the home.

Still a further object of the invention is to provide a process whereby the essential ingredients necessary for the preparation of milk shakes are always available and in convenient form to handle.

Yet another object of the invention is to provide a process whereby the ingredients of milk shakes may be more sanitarily kept.

A still further object of the invention is to provide a process whereby the preparation of milk shakes at the soda fountain is considerably simplified.

The invention contemplates reconstituting a dehydrated mix composed of the solid ingredients similar to the conventional type of malted milk shake in such manner as to produce a product having superior characteristics of taste and texture. The dehydrated mix may be prepared by mechanically combining in dehydrated form in the desired proportions ingredients such as dry ice cream mix, dry whole milk, sugar, cocoa and malted milk. Alternatively, the dehydrated mix may be prepared by dehydrating, as by spray drying, or roll drying, a liquid mixture of the ingredients proportioned to contain the desired amount of the solid ingredients, such as butter fat, milk-solids-not-fat, cocoa, stabilizer and sugar.

In accordance with the invention, it is proposed to prepare the malted milk beverage by intimately mixing or stirring with a conventional malted milk mixer a dehydrated mix composed of the solid ingredients with the proper proportions of water and ice, the ice being in such a finely divided state as to resemble snow, and known in the trade as "snow ice." By using snow ice it is possible to obtain a thick, creamy, and smooth product. In the event it is desired to employ ice in a coarser state, such as chipped ice, it is then advantageous to employ a mixer capable of more vigorous admixing action, and one which possesses means, such as a cutting blade, to subdivide the coarse ice particles into the fine form desired. A suitable mixer is shown in U. S. Patent 1,997,873, issued April 16, 1935. These mixers possess agitators provided with cutting blades which, when in operation, are capable of subdividing the ice to a minute form.

Although the dehydrated mix may vary widely in the relative amounts of the various ingredients contained therein, depending on flavor, appearance and texture desired in the final product, it is preferred to so form the mix as to contain about equivalent proportions of solids present in the conventional type of malted milk shake. For example, a suitable mix may be composed of the following solids in the amounts given by weight:

| Ingredients: | Parts |
|---|---|
| Butter fat | 15 to 35 |
| Milk-solids-not-fat | 20 to 40 |
| Cocoa | 4 to 12 |
| Sugar | 20 to 40 |
| Malted milk | 5 to 15 |

As a more specific illustrative example of a suitable mix the following formula is given:

| Ingredients: | Per cent |
|---|---|
| Butter fat | 25 |
| Milk-solids-not-fat | 35 |
| Cocoa | 10 |
| Sugar | 20 |
| Malted milk | 10 |

It is often advantageous, though not imperative, to incorporate with the above ingredients a small amount of stabilizer, an amount ranging from about 2 to 5 per cent being suitable. As examples of suitable stabilizers may be mentioned such materials as locust bean gum, Irish moss, algin, carboxy methyl cellulose, a mixture composed of two-thirds gelatin and one-third monoglyceride, etc. The stabilizer is added preferably to the liquid mixture prior to drying.

The mix is preferably prepared by spray-drying the mixture containing the desired amounts of solids, rather than by combining the ingredients dried separately. We have found that the mix obtained from drying the mixture is a more stable substance and is more resistant to oxidative deterioration. The spray-drying of the mixture yields a more stable product because the anti-oxidant power of the cocoa is better utilized through the more intimate contact between the cocoa particles and the readily oxidized particles of the fat, resulting from the solution of these prior to drying.

In preparing the liquid mix, it is advantageous to add before drying only about 25 per cent of the total sugar content desired in the final product, the remainder of the sugar being incorporated later into the dry mix. Drying of the mixture in the presence of a small amount of sugar proceeds more smoothly and efficiently than is the case if the sugar were all added prior to drying. The stabilizer may also be added in portions before and after drying.

The amounts of water and ice employed to reconstitute the dry mix may vary depending, for example, on the consistency desired in the final product and the temperature of the water used. Although we have found that a superior, smooth, thick body may be effected in the final beverage by employing a ratio of about 50 grams of water at about room temperature and about 100 grams of shaved or chipped ice to about 100 grams of the powder, we may employ about 25 grams to 75 grams of water and about 75 grams to 200 grams of ice per 100 grams of powder. In reconstituting the dry powder it is preferred to stir the powder with sufficient water to wet the powder, after which the remainder of the water and the ice are added and the whole vigorously stirred as hereinabove described.

In the event it is desired to prepare a milk shake other than the chocolate flavored, with or without malted milk, as for example, strawberry, vanilla, banana and cherry, the chocolate or cocoa is omitted from the hereinabove given formulas and the desired flavoring material substituted therefor. In preparing these other flavors, it is preferred to add the desired flavoring matter at the time of reconstituting the dry mix although the flavor material may be dried along with the other ingredients.

When it is desired to prepare flavored milk shakes of different flavors, it is often advantageous to prepare a dry mix of materials common to all milk shakes, that is, butter fat, milk-solids-not-fat, and sugar. These basic materials may then be combined with other ingredients to produce the desired formula. The basic mix may be composed of the following ingredients within about the given range of proportions by weight:

| Ingredients: | Parts |
| --- | --- |
| Butter fat | 15 to 35 |
| Milk-solids-not-fat | 20 to 40 |
| Sugar | 20 to 40 |

To prepare a malted milk shake, about 5 to 15 parts of malted milk are added to the above amounts of materials, and at the time of reconstituting, 4 to 12 parts of flavoring matter. As a more specific formula of the basic materials suitable for any milk shake the following is given:

| Ingredients: | Parts |
| --- | --- |
| Butter fat | 25 |
| Milk-solids-not-fat | 35 |
| Sugar | 20 |

To the above formula may be added malted milk, flavoring matter, and stabilizer as hereinabove described.

It is to be understood that the amount of flavoring matter added to the mixture at the time of reconstitution may vary within wide limits depending on the intensity of flavor desired and the type of flavoring material employed. Certain extracts or synthetic flavors are effective in small amounts; for example, 5 to 10 ml. of commercially available vanilla extracts are often satisfactory in preparing vanilla milk shakes. Sometimes it is advantageous to add a small amount of vanilla to reinforce the particular flavor desired. On the other hand, when the flavor is derived from the use of the fresh or preserved fruit, such as fresh or preserved strawberries, or a syrup thereof, the amounts of flavoring material required to impart the desired flavor to the finished beverage are larger.

As an example of the invention, 65 pounds of condensed skim milk, 72 pounds of milk having a fat content of 4 per cent, 48 pounds of cream having a fat content of 36 per cent, 4 pounds of cane sugar, 6 pounds of dextrose, 1 pound of stabilizer consisting of two-thirds gelatin and one-third monoglyceride, 7 pounds cocoa, and 8 pounds of malted milk were mixed, homogenized, and then spray-dried. To 70 pounds of the resulting powder there were added 27 pounds of sugar, 2 pounds of alginic acid, and 1 pound of powdered vanilla, and the whole thoroughly mixed. 100 grams of this mixture were then stirred in a malted milk shaker in the presence of 50 grams of water and 150 grams of fine ice until a cold, thick, smooth beverage resulted.

As a further illustrative example of the invention the following dry mix was prepared:

| | Pounds |
| --- | --- |
| Powdered ice cream mix | 60 |
| Dried whole milk | 12 |
| Cocoa | 7 |
| Cane sugar | 11 |
| Malted milk | 8 |
| Algin | 2 |

100 grams of the above mixture were placed in a Stevens mixer, mixed with 50 grams of water at a temperature of 60° F. until the mass was wet, after which there were added 150 grams of chipped ice. The mixture was stirred until a cold, viscous, smooth product resulted.

As another example of the invention, 90 grams of dry powder composed of 60 grams of powdered ice cream mix, 16 grams of dried whole milk, 12 grams of cane sugar and 2 grams of algin were mixed in a malted milk mixer with 50 grams of water. There were then added 10 grams of strawberry syrup, and thereafter 150 grams of snow ice. After stirring for about 3 to 4 minutes, there resulted a thick, smooth, cold strawberry milk shake.

Obviously, many modifications and variations of the invention, as hereinbefore set forth, may be made without departing from the spirit and scope thereof, and therefore only such limitations should be imposed as are indicated in the appended claims.

I claim:

1. A process for the preparation of milk shakes from a dry powdered mix of ice cream constituents and dried milk containing about 15 to 35 parts of butterfat, 20 to 40 parts of milk-solids-not-fat, and 20 to 40 parts of sugar which comprises adding thereto from 25 to 75 grams of water per 100 grams of dry powder in order to form with said powder a wet mass, adding flavoring material and ice to said mass, the ice being added in the ratio of from 75 to 200 grams of ice per 100 grams of dry powder, and stirring the resulting mixture to obtain a milk shake having a reconstituted texture and body similar to a milk shake prepared from liquid ice cream.

2. A process for the preparation of milk shakes from a dry mix of ice cream constituents and dried milk, containing about 15 to 35 parts of butterfat, 20 to 40 parts of milk-solids-not-fat, 20 to 40 parts of sugar, flavoring and a stabilizer, which comprises: adding thereto from 25 to 75 grams of water per 100 grams of dry mix in order to form with said mix a wet mass, adding ice to said mass in the ratio of from 75 to 200 grams of ice per 100 grams of dry mix, and stirring the resulting mixture to obtain a milk shake having a reconstituted texture and body similar to a milk shake prepared from frozen ice cream.

EVERETTE C. SCOTT.

REFERENCES CITED

The following references are of record in the file of this patent:

UNITED STATES PATENTS

| Number | Name | Date |
|---|---|---|
| 1,236,700 | Gere | Aug. 14, 1917 |

OTHER REFERENCES

"Home Made Beverages" by A. A. Hopkins, published 1919 by the Scientific American Publishing Co., New York, pages 64, 96 and 97.

Chem. and Met. Eng. vol. 35, (pages 470 to 472), 1928.